No. 850,670. PATENTED APR. 16, 1907.
T. W. McCLENAHAN.
MOLDING PROCESS.
APPLICATION FILED APR. 5, 1906.
Fig. 1.
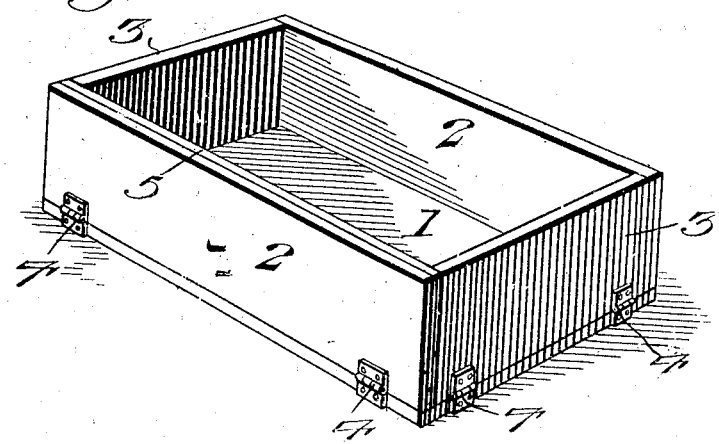
Fig. 2. Fig. 3.
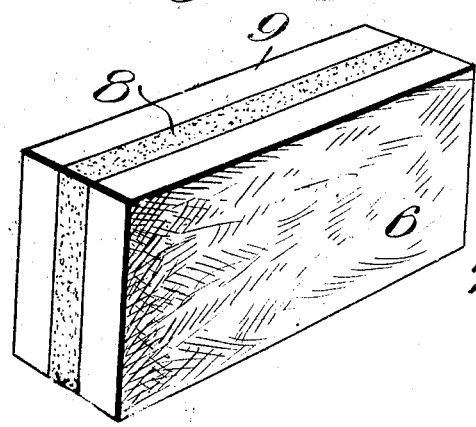 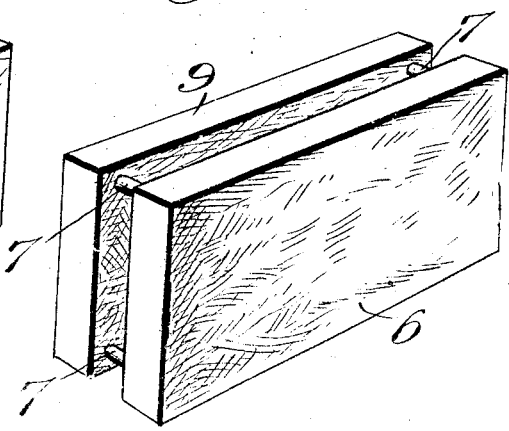
Fig. 7.
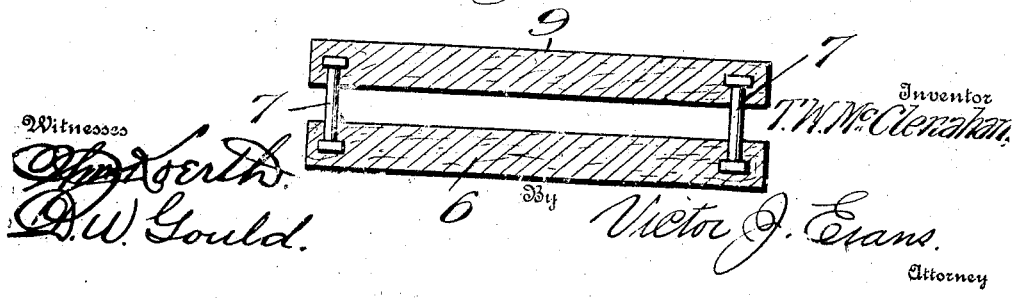
Witnesses
Inventor
T. W. McClenahan,
By Victor J. Evans.
Attorney

UNITED STATES PATENT OFFICE.

TIMOTHY W. McCLENAHAN, OF YORK, PENNSYLVANIA.

MOLDING PROCESS.

No. 850,670.  Specification of Letters Patent.  Patented April 16, 1907.

Application filed April 5, 1906. Serial No. 310,068.

*To all whom it may concern:*

Be it known that I, TIMOTHY W. McCLENAHAN, a citizen of the United States, residing at York, in the county of York and State of Pennsylvania, have invented new and useful Improvements in Molding Processes, of which the following is a specification.

The invention relates to an improved molding process primarily designed for the production of cement or other composite building-blocks.

In molding composite articles of this nature it has been found that the complete saturation necessary to produce the proper crystallization of the binding element in the final setting of the composition is objectionable in the initial molding operation, for the reason that the materials when in the saturated condition will adhere to the walls of the mold to an extent to prevent the removal of the article from the mold in perfect condition. It is therefore necessary that in the molding operation the percentage of moisture be relatively slight, so as to produce only a sufficient interadherence of the particles as will provide for their proper formation within the mold without liability of adherence to the mold-walls. After such initial operation and the removal of the formed article from the mold for curing it is essential that the materials be saturated in order to produce the desired crystallization and hardening.

It has been heretofore proposed to mold the materials in a moistened condition and after such molding to add a sufficient quantity of liquid to produce the necessary saturation. All such processes with which I am familiar have been objectionable as heretofore practiced, for the reason that no satisfactory method has been devised for saturating the molded articles to the extent desired during the initial setting thereof and immediately after its removal from the mold.

It is the object of the present process, therefore, to provide a simple and economic method whereby the molded articles after their formation within the mold and removal therefrom may be saturated to an extent to produce a perfect initial setting, final setting, and hardening.

In carrying out the present process the materials prior to the molding operation are moistened to the slight degree necessary to insure such adherence of the particles as will provide for a proper molding without liability of sticking within the mold and subsequently in the process of molding are combined with a saturated or supersaturated vehicle which in the initial setting, final setting, and hardening of the article will yield to the materials of the article the quantity of liquid necessary for the proper setting and hardening effect.

The specific details of the present process will be described in the following specification with particular reference to the formation of hollow building-blocks, a specific form of which is illustrated in the accompanying drawings, wherein—

Figure 1 is a perspective view of the molding-flask used in carrying out the molding step of the process. Fig. 2 is a perspective view of the block formed in the process, the saturated vehicle being shown in place. Fig. 3 is a similar view of the completed block with the saturated vehicle removed. Fig. 4 is a section of the block, illustrating the connection between the spaced layers thereof.

In carrying out the process and as one of the mechanical aids thereto I utilize a flask, preferably of the form shown in Fig. 1, wherein 1 designates a bottom of the particular size and contour desired, the side walls 2 and end walls 3 of the flask having a hinged connection with the bottom at 4, whereby said sides and ends may be assembled relatively to the bottom to form the usual hollow flask or may be swung outwardly from each other to permit of the convenient removal of the molded article. By preference I utilize in connection with one of the side walls a removable strip or palette 5, which in the molding operation serves, in effect, as a side of the mold-flask and after the initial molding operation will serve as a support for the convenient removal and handling of the molded article. In carrying out the process for the production of the hollow building-block the materials forming said block are initially moistened to an extent to cause sufficient adherence between the particles of such materials to permit proper coherence within the mold. A quantity of such moistened material is then tamped into the flask to the depth desired for one of the layers 6 of the block. The double-headed tie members or rods 7 are introduced into this layer, preferably adjacent the corners, prior to the initial setting of the materials, said tie members being disposed at right angles to the surface of the layer, so that their upper headed ends will be enveloped in the material of the upper layer.

After a proper tamping of the first layer within the flask the saturated vehicle is introduced in the form of a layer 8. This vehicle is preferably sand which has been previously wet to the point of saturation, though it is obvious that other materials may be used therefor, as the necessities of the process require simply a material which may be saturated to the point desired and which will not chemically combine with the composition forming the layers. After the proper insertion of a saturated vehicle a second layer 9 of the composition is introduced to rest on the saturated layer. The second layer of the composition will envelop the upper headed ends of the tie members 6, so that said tie members will be embedded in the respective layers in a manner to maintain them in spaced parallel relation after the removal of the saturated vehicle. After the initial setting of the composition within the flask, which occurs in a comparatively short time, the flask is turned upon the side carrying the palette, the ends and side walls are swung away from the article, and the latter, supported on the palette, is wholly removed from the flask for final setting and curing. During the final setting and curing the saturated vehicle will impart to the layers of the composition the requisite degree of moisture necessary to produce the proper setting and hardening of the composition.

As the saturated vehicle is evenly and regularly disposed between the layers of the block, it is evident that the liquid will be equally supplied to all parts of each layer, so that the resultant block is of even density and hardness throughout. As the moisture or liquid is absorbed from the vehicle when using sand for the latter, said vehicle will gradually resume its granular forms, so that when in dry condition the vehicle may be readily removed from between the layers of the block.

It is to be particularly noted in connection with the present process that the saturated vehicle will, in effect, automatically deliver to the layers of composition that degree of moisture necessary for the proper chemical changes in said composition during the final setting and hardening and that the delivery of such moisture will be regularly and uniformly accomplished mainly through the affinity of the composition for such moisture. This insures the absolutely proper combination of moisture with the materials of the composition, as such materials will of necessity absorb that degree of moisture from the vehicle best suited for the proper chemical combination.

As the saturated vehicle is exposed between the layers of composition, it is obvious that such vehicle may, if necessary, be further saturated from time to time, the granular nature of the vehicle insuring that such additional water will be evenly supplied throughout the body of the vehicle.

The particular form of block above described is highly desirable for building purposes, for the reason that an absolutely dead-air space will be formed between the layers when the blocks are assembled, thereby preventing the penetration of such air-space by moisture or frost, in which result the block described is to be distinguished from the usual hollow block in which the spaced sections of the block are connected by transverse webs or the like, as in the latter formation the webs form a medium of transmission for the moisture or frost.

The process is of course applicable to the construction of slabs or blocks other than the particular form of block described, and such uses of the process are within the spirit and scope of the present invention.

Having thus described the invention, what is claimed as new is—

1. The herein-described process of molding composition bodies, consisting in initially molding the composition in a moistened state and adding thereto a layer of a vehicle saturated with moisture.

2. The herein-described process of molding composition bodies consisting in initially forming a moistened layer of the composition and adding thereto a layer of sand saturated with moisture.

3. The process of producing a building-block consisting in shaping a layer of moistened composition, adding thereto a layer of sand saturated with moisture, and shaping a second layer of moistened composition upon the sand layer.

4. The process of producing a building-block consisting in molding a layer of composition in moistened state, imposing thereon a layer of material saturated with moisture; and disposing on said material a second layer of the composition in a moistened state.

5. The process of producing a building-block consisting in molding a layer of composition in moistened state, imposing thereon a layer of material saturated with moisture, and disposing on said material a second layer of the composition in a moistened state. and removing the article from the mold with all layers intact.

6. The process of producing a building-block consisting in molding a layer of composition in moistened state, disposing thereon a layer of liquid-saturated sand, and disposing on said sand a second layer of the composition in a moistened state.

In testimony whereof I affix my signature in presence of two witnesses.

TIMOTHY W. McCLENAHAN.

Witnesses:
F. WILLIAM KUNKEL,
LUTHER C. HAWK.